United States Patent
Terashima (10) Patent No.: US 9,353,831 B2
(45) Date of Patent: May 31, 2016

(54) CONTROL METHOD FOR DUAL CLUTCH TRANSMISSION, DUAL CLUTCH TRANSMISSION, AND VEHICLE LOADED WITH SAME

(75) Inventor: Koji Terashima, Fujisawa Kanagawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 152 days.

(21) Appl. No.: 14/232,594

(22) PCT Filed: Jun. 29, 2012

(86) PCT No.: PCT/JP2012/066708
§ 371 (c)(1),
(2), (4) Date: Jan. 13, 2014

(87) PCT Pub. No.: WO2013/008648
PCT Pub. Date: Jan. 17, 2013

(65) Prior Publication Data
US 2014/0150584 A1     Jun. 5, 2014

(30) Foreign Application Priority Data
Jul. 13, 2011   (JP) ................................. 2011-155082

(51) Int. Cl.
*F16H 3/10* (2006.01)
*F16H 3/08* (2006.01)
(Continued)

(52) U.S. Cl.
CPC  *F16H 3/08* (2013.01); *F16D 21/06* (2013.01);
*F16D 21/08* (2013.01); *F16H 3/006* (2013.01);
(Continued)

(58) Field of Classification Search
CPC ............... F16H 3/10; F16H 3/12; F16H 3/08; F16H 3/006; F16H 61/688; F16D 21/06; F16D 21/08

USPC ..................... 74/330, 661, 665, 665 A, 665 B
See application file for complete search history.

(56) References Cited

U.S. PATENT DOCUMENTS 2,282,591 A  *  5/1942  Orr ......................... F16D 23/04
                                                      192/48.4
8,116,951 B2 *  2/2012  Holmes .................... B60K 6/36
                                                      475/208

(Continued)

FOREIGN PATENT DOCUMENTS

EP         2256359 A1    12/2010
JP         61-274146     12/1986
(Continued)

OTHER PUBLICATIONS

International Search Report dated Sep. 4, 2012 in PCT/JP2012/066708.
(Continued)

*Primary Examiner* — William Kelleher
*Assistant Examiner* — Bobby Rushing, Jr.
(74) *Attorney, Agent, or Firm* — Staas & Halsey LLP (57) ABSTRACT

A method for controlling a dual clutch transmission, a dual clutch transmission, and a vehicle equipped with the same. A first input shaft is connected to a first clutch and a second input shaft is connected to a second clutch. A set of odd-numbered gears and a set of even-numbered gears are arranged respectively across the first input shaft and second input shaft and an output shaft. Two of the gears are set as a start gear and a support gear, respectively. A one-way clutch is provided between the support gear and the first input shaft to let the support gear freewheel when a vehicle is started by synchronously engaging the start gear and the support gear to the second input shaft and the first input shaft, respectively, and simultaneously bringing each of the first clutch and the second clutch into a connected state. A third clutch connects the first input shaft and the second input shaft and rotates them together when the vehicle is started.

5 Claims, 9 Drawing Sheets

(51) Int. Cl.
  *F16D 21/06* (2006.01)
  *F16D 21/08* (2006.01)
  *F16H 61/688* (2006.01)
  *F16H 3/00* (2006.01)

(52) U.S. Cl.
  CPC .............. *F16H 3/10* (2013.01); *F16H 61/688* (2013.01); *F16H 2312/02* (2013.01); *Y10T 74/19228* (2015.01)

(56) References Cited

U.S. PATENT DOCUMENTS

| | | | | |
|---|---|---|---|---|
| 8,429,992 B2 * | 4/2013 | Braford | ................ | F16H 3/006 74/331 |
| 8,434,380 B2 * | 5/2013 | Ross | ................ | F16H 3/006 74/330 |
| 8,549,943 B2 * | 10/2013 | Li | ................ | F16H 3/006 74/330 |
| 2007/0227282 A1 | 10/2007 | Forsyth | | |

FOREIGN PATENT DOCUMENTS

| | | |
|---|---|---|
| JP | 2006-132562 | 5/2006 |
| JP | 2006-153048 | 6/2006 |
| JP | 2008-309325 | 12/2008 |
| JP | 2010-223415 | 10/2010 |
| JP | 2011-112174 | 6/2011 |

OTHER PUBLICATIONS

English Abstract of JP 61-274146.

* cited by examiner

PRIOR ART

FIG. 9

PRIOR ART

CONTROL METHOD FOR DUAL CLUTCH TRANSMISSION, DUAL CLUTCH TRANSMISSION, AND VEHICLE LOADED WITH SAME

This application claims the benefit under 35 U.S.C. Section 371, of PCT International Application No. PCT/JP2012/066708, filed Jun 29, 2012, and under 35 U.S.C. §119 of Japanese Application No. 2011-155082 filed Jul 13, 2011, the contents of which are incorporated herein by reference.

TECHNICAL FIELD

The present invention relates to a method of controlling a dual clutch transmission, a dual clutch transmission, and a vehicle equipped with the same which reduce the load on both clutches and reduce the wear thereof to thereby improve the durability thereof, the dual clutch transmission including at least two input shafts and two clutches to smoothen gear shift operations.

BACKGROUND ART

Heretofore, a dual clutch transmission (hereinafter, referred to as the DCT) including two clutch systems has been developed for improvement in the gear shift time of an automated manual transmission (hereinafter, referred to as the AMT). The DCT generally includes a clutch for each of an even-numbered gear set and an odd-numbered gear set and shifts by switching the clutches. For this reason, a gear shift operation of an odd-numbered gear (or an even-numbered gear) can be performed while an even-numbered gear (or an odd-numbered gear) is being used. This DCT allows a quick gear shift with no gear shift time lag. Moreover, since the DCT transmits power by means of clutches, it has a simple structure and the power loss is small, or the transmission efficiency is good, which leads to improvement in fuel consumption.

Figure 8:
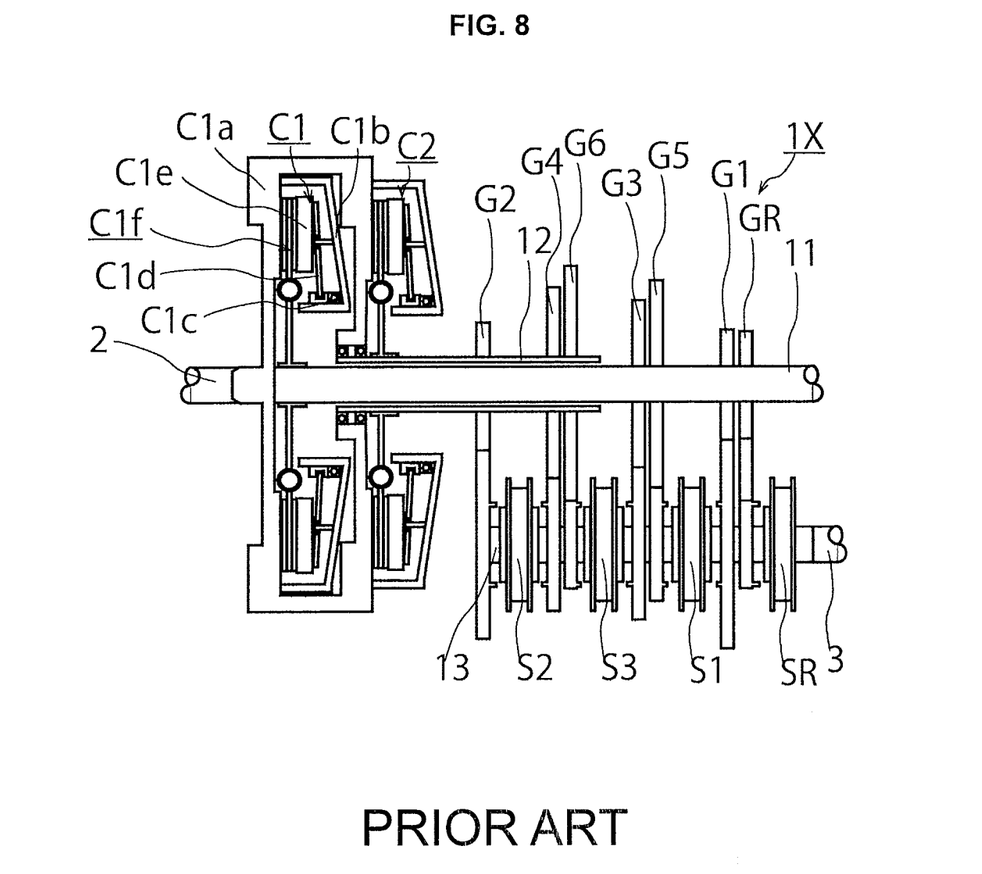
FIG. 8 is a diagram showing a conventional dual clutch transmission.

Here, the conventional DCT will be described with reference to FIGS. 8 and 9. As shown in FIG. 8, a DCT 1X includes a first input shaft 11, a second input shaft 12, a first clutch C1, a second clutch C2, a countershaft 13, gears G1 to G6, a gear GR, coupling sleeves S1 to S3, and a coupling sleeve SR.

The power of an engine (internal combustion engine) is received from a crankshaft 2 through the first clutch C1 or the second clutch C2, and that power is transmitted to an output shaft 3 after its speed is changed at one of the gears.

The second input shaft 12 is formed in a hollow shape, and the first input shaft 11 is coaxially inserted in the second input shaft 12. The gears G1, G3, G5, and GR are arranged on the first input shaft 11, and the gears G2, G4, and G6 are arranged on the second input shaft. The power can be transmitted by connecting the first clutch C1 to the first input shaft 11 or the second clutch C2 to the second input shaft, and synchronously engaging one of the coupling sleeves S1 to SR provided on the countershaft 13 to one of the gears G1 to GR.

The clutch C1 includes a flywheel C1a, a clutch cover C1b, a release bearing C1c, a diaphragm spring C1d, a pressure plate C1e, and a clutch disk C1f formed of a lining, a torsion damper, a thrust, and the like. The clutch C2 has a similar configuration as well.

Figure 9:
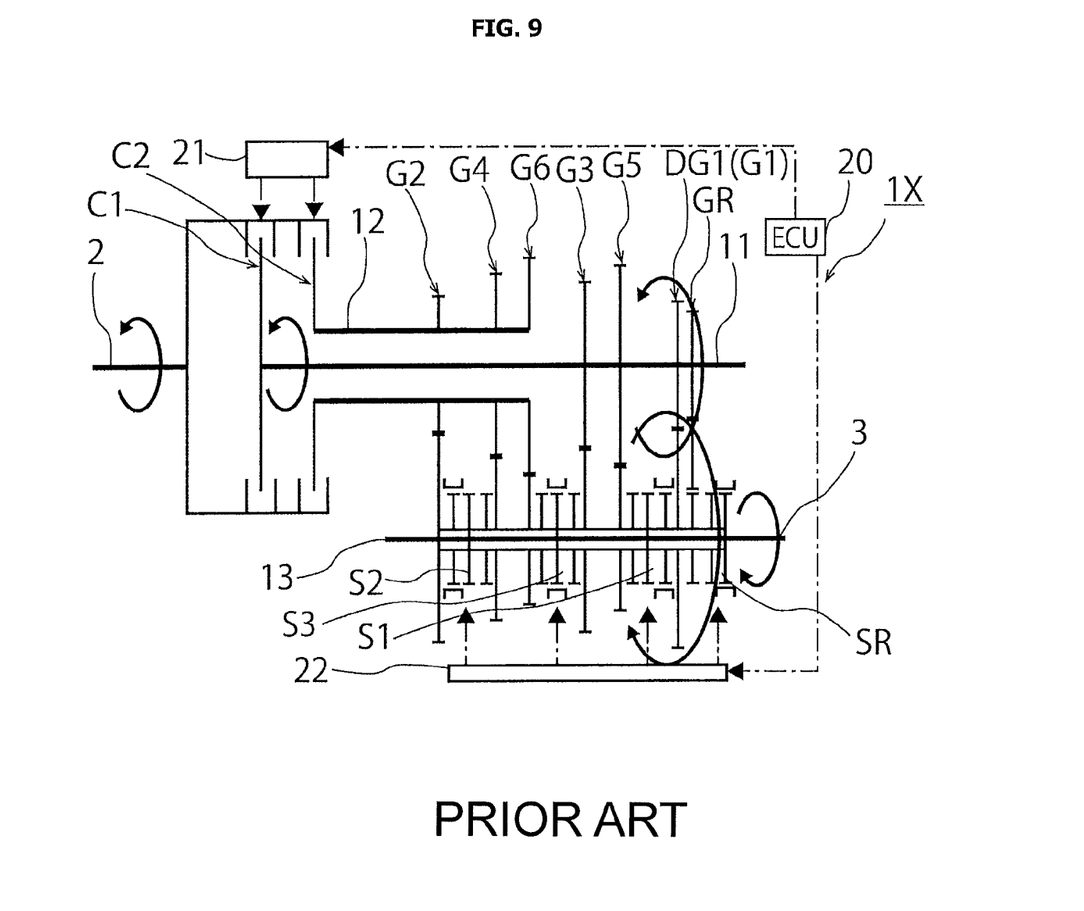
FIG. 9 is a schematic diagram showing the conventional dual clutch transmission.

As shown in FIG. 9, the DCT 1X described above further includes an ECU (control device) 20, a clutch operation mechanism 21 which operates the clutch C1 or the clutch C2, and a synchronous engagement mechanism 22 which operates the coupling sleeves S1 to SR. Hydraulic pistons or the like can be used for the clutch operation mechanism 21 and the synchronous engagement mechanism 22.

Next, the operation of this DCT 1X during start will be described. This DCT 1X uses the gear G1 as a start gear DG1. When the vehicle stops travelling and the engine stops, the ECU 20 disconnects the first clutch C1 and the second clutch C2 and synchronously engages the coupling sleeve S1 to the start gear DG1. When the vehicle starts, the ECU 20 connects the first clutch C1 to the first input shaft 11. Circular arrows in FIG. 9 illustrate the transmission of power during this state.

Then, the ECU 20 synchronously engages the coupling sleeve S2 to the gear G2 so that smooth acceleration will be performed. In this way, in the case of a shift from the start gear DG1 to the gear G2, the first clutch C1 is disconnected (hereinafter, expressed as being fully disconnected), and the second clutch C2 is connected to the second input shaft 12 (hereinafter, expressed as being fully connected). Since the connection can be switched back and forth as described above, gear shift operations can be done smoothly.

Here, as described above, the DCT normally uses a predetermined gear such as the first gear or the second gear for start. Thus, the clutch to be used for start is either the one for the odd-numbered gears or the one for the even-numbered gears. Such a clutch is subjected to high load when brought into a connected state during start and wears accordingly. Thus, one of the clutches, the one for the odd-number gears or the one for the even-numbered gears, wears faster.

A clutch of a sufficiently large volume may be used to prevent this clutch wear. It is, however, difficult to secure a sufficiently large volume in the case of a DCT with two clutches housed in a small space. Meanwhile, there are devices employing a method that involves switching the start gear based on the worn states of the clutches, a start condition, etc. (see Patent Document 1 and Patent Document 2, for example). These devices can make the wear of the clutches even by selecting the appropriate start gear based on the worn states of the clutches. This, however, leads to a problem of changing the feel during start, which impairs the driving comfort of the vehicle.

PRIOR ART DOCUMENTS

Patent Document 1: Japanese patent application Kokai publication No. 2006-132562
Patent Document 2: Japanese patent application Kokai publication No. 2008-309325

SUMMARY OF THE INVENTION

The present invention has been made in view of the above problem, and an object thereof is to provide a method of controlling a dual clutch transmission, a dual clutch transmission, and a vehicle equipped with the same which can reduce the load on one of clutches to suppress the occurrence of wear of only the one clutch and therefore make the clutch replacement interval longer, without changing the feel during start of the vehicle. In addition, an object of the present invention to provide a method of controlling a dual clutch transmission, a dual clutch transmission, and a vehicle equipped with the same which prevents double engagement that may otherwise occur due to use of both clutches, and which also prevents decrease in torque to an output shaft.

A dual clutch transmission for achieving the above-described objects is a dual clutch transmission which includes at least a first input shaft configured to be connected to a first clutch and a second input shaft configured to be connected to a second clutch, and in which a set of odd-numbered gears and a set of even-numbered gears are arranged respectively across the first input shaft and an output shaft and across the second input shaft and the output shaft, and in a case of starting transmission of power from a power source to the output shaft, the transmission of the power is started by synchronously engaging a start gear being one of the gears for start to the second input shaft and connecting the second clutch to the second input shaft, wherein the dual clutch transmission includes: a support gear disposed on the first input shaft and having a gear ratio different from that of the start gear; and a rotation disconnecting mechanism between the support gear and the first input shaft, the rotation disconnecting mechanism being configured to let the support gear freewheel when the transmission of the power from the power source to the output shaft is started by synchronously engaging the start gear and the support gear to the second input shaft and the first input shaft, respectively, and simultaneously bringing each of the first clutch and the second clutch into a connected state.

By using both clutches at the moment of start of the vehicle, the wear of the clutch on the start gear side can be reduced, and therefore the clutch replacement interval can be made longer. However, using both clutches may possibly cause double engagement. In this respect, the above configuration includes the rotation disconnecting mechanism configured to let the support gear freewheel when the rotational speed is lower than the gear rotational speed of the support gear so that the rotation of the input shaft will not be transmitted to the support gear from it. In this way, when both clutches are connected simultaneously, the support gear freewheels and transmits no torque, thereby preventing double engagement. Accordingly, it is possible to safely reduce the load on both clutches and reduce the wear thereof.

Moreover, in the above-described dual clutch transmission, any one of the first input shaft and the second input shaft is formed as a hollow shaft, and the other as an insertion shaft is inserted inside the hollow shaft coaxially, and the dual clutch transmission further includes an input connecting mechanism configured to rotate the hollow shaft and the insertion shaft together when the transmission of the power from the power source to the output shaft is started.

According to this configuration, the input connecting mechanism can connect both input shafts and rotate them together. Thus, when both clutches are engaged simultaneously, the support gear freewheels and transmits no torque since the input rotational speed is lower than the gear rotational speed. At the same time, the torque transmitted to both input shafts through both clutches can be transmitted entirely to the start gear since both input shafts are rotated together through the input connecting mechanism. Accordingly, the torque to the output shaft does not decrease even when both clutches are used.

In addition, in the above-described dual clutch transmission, the rotation disconnecting mechanism is formed of a one-way clutch configured to let the support gear freewheel when a rotational speed of the first input shaft is a rotational speed lower than a gear rotational speed of the support gear. According to this configuration, the one-way clutch allows no torque transmission when the rotational speed of the input shaft is a rotational speed lower than that of the support gear. Thus, double engagement can be prevented.

A vehicle for achieving the above-described objects is equipped with the above-described dual clutch transmission. According to this configuration, the wear of the clutches can be made even, and the feel during start does not change. Thus, a vehicle with good driving comfort can be provided.

A method of controlling a dual clutch transmission for achieving the above-described objects is a method of controlling a dual clutch transmission which includes at least a first input shaft configured to be connected to a first clutch and a second input shaft configured to be connected to a second clutch, and in which a set of odd-numbered gears and a set of even-numbered gears are arranged respectively across the first input shaft and an output shaft and across the second input shaft and the output shaft, and in a case of starting transmission of power from a power source to the output shaft, the transmission of the power is started by synchronously engaging a start gear being one of the gears for start to the second input shaft and connecting the second clutch to the second input shaft, wherein the method includes causing an input connecting mechanism to rotate the first input shaft and the second input shaft together and causing a rotation disconnecting mechanism to let a support gear freewheel, when the transmission of the power from the power source to the output shaft is started by synchronously engaging the start gear and the support gear to the second input shaft and the first input shaft, respectively, and simultaneously bringing each of the first clutch and the second clutch into a connected state, the support gear having a gear ratio different from that of the start gear.

According to this method, double engagement can be prevented and the torque transmitted to both clutches can be transmitted efficiently to the start gear, even when both clutches are used to start the vehicle for the purpose of reducing the load on one of the clutches and reducing the wear thereof.

According to the present invention, it is possible to reduce the load on one of the clutches to suppress the occurrence of wear of only the one clutch and therefore make the clutch replacement interval longer, without changing the feel during start. In addition, the present invention prevents double engagement that may otherwise occur due to the use of both clutches, and also prevents decrease in the torque to the output shaft.

DESCRIPTION OF EMBODIMENTS

Hereinbelow, methods of controlling a dual clutch transmission, dual clutch transmissions, and vehicles equipped with the same of first, second, and third embodiments according to the present invention will be described with reference to the drawings. Note that the same components and operations as those of the conventional dual clutch transmission (DCT) shown in FIGS. 8 and 9 will be denoted by the same reference numerals, and description thereof will be omitted. Moreover, while the first, second, and third embodiments according to the present invention will be illustrated by using a six-speed DCT, the number of gears is not limited and the DCTs of the present invention may be an eight-speed DCT, for example.

Figure 1:
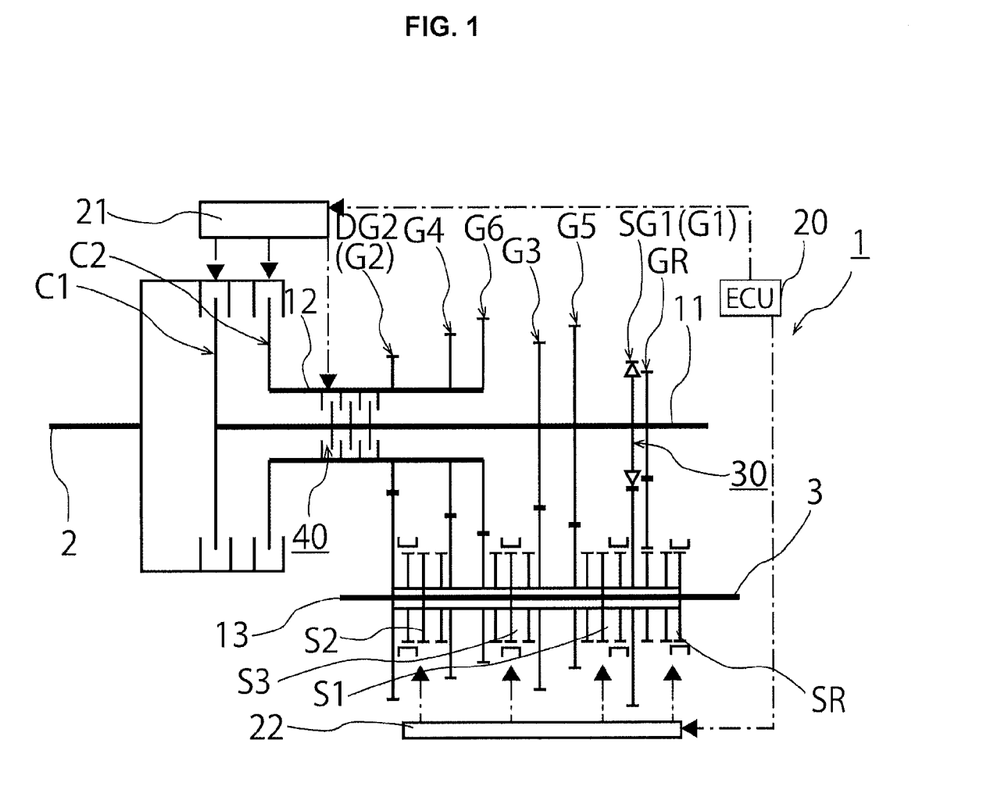
FIG. 1 is a schematic diagram showing a dual clutch transmission of a first embodiment according to the present invention.

As shown in FIG. 1, a dual clutch transmission (hereinafter, referred to as the DCT) 1 of the first embodiment according to the present invention, includes a first input shaft 11, a second input shaft 12, a first clutch Cl, a second clutch C2, a countershaft 13, gears G1 to G6, a gear GR, coupling sleeves S1 to S3, a coupling sleeve SR, an ECU (control device) 20, a clutch operation mechanism 21, and a synchronous engagement mechanism 22, and uses a configuration similar to that of the conventional DCT X1 shown in FIG. 8. However, as shown in FIG. 1, the configuration is different from that of the conventional DCT X1 in that: the gear G2 and the gear G1 serve as a start gear DG2 and a support gear SG1, respectively; the clutch operation mechanism 21 is configured to be capable of simultaneously operating both clutches C1 and C2; and a one-way clutch (rotation disconnecting mechanism) 30 and a third clutch (input connecting mechanism) 40 are added.

This DCT 1 is not limited to the above configuration as long as it is an automated manual transmission, and no limitation is imposed on the arrangement of both input shafts, the numbers of the input shafts and the clutches mounted, the number of the gears, and so on. For example, it is possible to employ a configuration in which both input shafts are disposed not coaxially but in parallel with each other with the countershaft disposed between the input shafts. Moreover, the present invention may be applied to a triple clutch transmission including three clutches.

In the above configuration, the gear G2 is the start gear DG2, and the gear G1 which synchronously engages with the first input shaft 11 at a gear ratio lower than the start gear DG2 by one speed is the support gear SG1. Moreover, the gear G3 which synchronously engages with the first input shaft 11 at a gear ratio higher than the start gear DG2 by one speed is an acceleration gear AG3. This start gear may be set to any gear. For example, when the gear G3 is the start gear, the gear G2 is set as the support gear, and the gear G4 is set as the acceleration gear.

The ECU 20 is configured to control the whole power plant including the transmission through electric circuits. The ECU 20 also controls the engine and is a microcontroller which performs total electrical control. In the case of an automatic transmission vehicle, the ECU 20 stores therein optimal control values for all the possible traveling states, and controls the mechanisms by causing sensors to detect the current state and selecting the optimal values from the stored data based input signals from the sensors.

This ECU 20 controls the connection of the first clutch C1 to the first input shaft 11 and the connection of the second clutch C2 to the second input shaft 12 independently and simultaneously.

In addition, the ECU 20 also performs control which brings the gears C1 to GR into synchronous engagement with the first input shaft 11 and the second input shaft 12 through the coupling sleeves S1 to SR. This control can bring the odd-numbered gear G1, G3, or G5 into synchronous engagement while the even-numbered gear G2, G4, or G6 is being used, for example, so as to achieve a smooth gear shift operation.

The clutch operation mechanism 21 only needs to be capable of operating the clutches C1 and C2 to connect them to the first input shaft 11 and the second input shaft 12, respectively, and operating the clutches C1 and C2 simultaneously. The clutch operation mechanism 21 is formed of a hydraulic piston, an electromagnetic actuator, and the like, for example. The synchronous engagement mechanism 22 includes shift forks which swing the coupling sleeves S1 to SR, and only needs to be capable of operating these shift forks. The synchronous engagement mechanism 22 is formed of a hydraulic piston, an electromagnetic actuator, and the like, for example. The clutch operation mechanism 21 and the synchronous engagement mechanism 22 are not limited to the configurations described above; the clutch operation mechanism 21 only needs to be capable of operating the clutches Cl and C2, and the synchronous engagement mechanism 22 only needs to be capable of operating the coupling sleeves.

The one-way clutch 30 is provided between the first input shaft and the support gear SG1 and is capable of letting the support gear SG1 freewheel when the rotational speed of the first input shaft 11 is lower than the gear rotational speed of the support gear SG1. This one-way clutch 30 will be described with reference to FIG. 2. As shown in Part (a) of FIG. 2, the one-way clutch 30 includes an outer race 31, an inner race 32, a gap portion 33, rollers 34, and springs 35. Moreover, the gap portion 33 has meshing portions 33a and freewheeling portions 33b.

Figure 2:
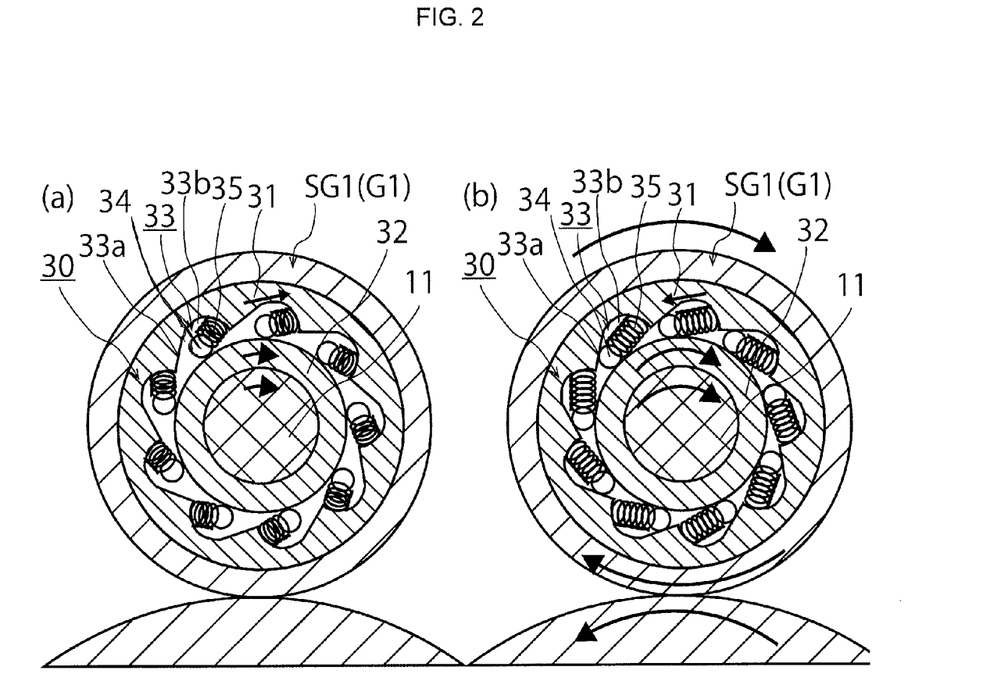
FIG. 2 is a set of cross-sectional views showing a one-way clutch taken along line II-II in FIG. 1. Part (a) shows a case where the rotational speed of a first input shaft is lower than the gear rotational speed of a support gear. Part (b) shows a case where the rotational speed of the first input shaft is equal to or higher than the gear rotational speed of the support gear.

Part (a) of FIG. 2 shows a case where the rotational speed of the first input shaft 11 is lower than the gear rotational speed of the support gear SG1. Part (b) of FIG. 2 shows a case where the rotational speed of the first input shaft 11 is equal to or higher than the gear rotational speed of the support gear SG1. As shown in Part (a) of FIG. 2, when the rotational speed of the first input shaft 11 is lower, the frictional force between the rollers 34 and the inner race 32 is greater than the biasing force with which the springs 35 bias their rollers 34, thus positioning the rollers 34 to their freewheeling portions 33b. As a result, the rotation of the first input shaft 11 is not transmitted to the outer race 31, and the outer race 31 does not rotate. Accordingly, the support gear SG1 freewheels. As shown in Part (b) of FIG. 2, when the rotational speed of the first input shaft 11 is higher, the rollers 34 are biased by their springs 35 and positioned to their meshing portions 33a. As a result, the outer race 31 and the inner race 32 rotate together through the rollers 34. Accordingly, the support gear SG1 rotates as well.

This one-way clutch 30 is not limited to the above configuration as long as it is capable of letting the support gear SG1 freewheel when the rotational speed of the first input shaft 11 is lower than the gear rotational speed of the support gear SG1. For example, a cam surface may be provided on the inner race. Alternatively, sprags, which are movable teeth, can be provided instead of the rollers 34.

Engine braking is no longer available when this one-way clutch 30 is interposed between the first input shaft 11 and the support gear SG1. Although the start gear may be set to any gear, it is preferable to set the support gear to a gear that has a low gear ratio among all the gears, and it is more preferable to set the start gear and the support gear to the gear G2 (second gear) and the gear G1 (first gear), respectively.

According to this configuration, the support gear SG1 freewheels through the one-way clutch 30 when the rotational speed of the first input shaft 11 is lower than the gear rotational speed of the support gear SG1. In this way, double engagement can be prevented even when both clutches C1 and C2 are used to start the vehicle.

The third clutch 40 is provided between the first input shaft 11 and the second input shaft 12 and is capable of rotating the first input shaft 11 and the second input shaft 12 together. This third clutch 40 will be described with reference to FIG. 3. The third clutch 40 is a wet multi-disc clutch and includes multiple outer discs 41, multiple inner discs 42, a release spring 43, a piston 44, a coil spring 45, a hydraulic chamber 46, a cylinder 47, and an oil pipe 48. The third clutch 40 also includes a thrust plate 12a on the second input shaft 12.

Figure 3:
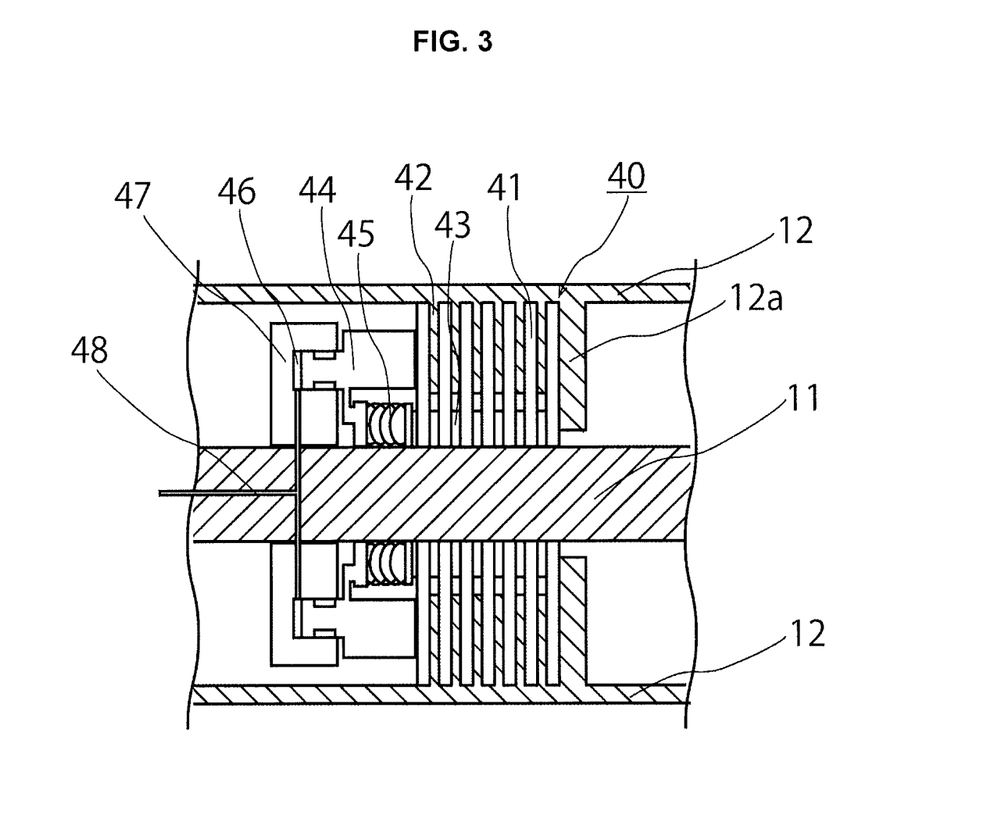
FIG. 3 is a diagram showing an input connecting mechanism in FIG. 1.

By raising hydraulic pressure to send hydraulic oil into the hydraulic chamber 46, this third clutch 40 actuates the piston 44 and pushes the outer discs 41. As a result, the outer discs 41 and the inner discs 42 are pressed against and contact each other. Accordingly, the third clutch 40 can be connected. On the other hand, by lowering the hydraulic pressure to withdraw the hydraulic oil, the coil spring 45 pushes the piston 44 back. As a result, the outer discs 41 and the inner discs 42 are separated from each other by the release spring 43. Accordingly, the third clutch 40 can be disconnected.

This third clutch 40 is not limited to the above configuration as long as it is capable of connecting and disconnecting the first input shaft 11 and the second input shaft 12. For example, it is possible to use a dry clutch, an electromagnetic clutch, a powder clutch, or the like. However, a multi-disc clutch using multiple discs, an electromagnetic clutch, or the like is preferable since the space between the first input shaft 11 and the second input shaft 12 is small and a sufficient clutch volume cannot be secured.

According to this configuration, by providing the one-way clutch 30, the support gear SG1 freewheels and prevents and transmits no torque to the output shaft 3. On the other hand, with the third clutch 40, the first input shaft 11 and the second input shaft 12 can be connected and rotated together. Accordingly, the torque transmitted by both clutches C1 and C2 can be transmitted entirely to the start gear DG2.

Next, the operation of the DCT 1 will be described with reference to FIG. 4. As shown in Part (a) of FIG. 4, when the vehicle starts, the ECU 20 synchronously engages the start gear DG2 and the support gear SG1 to the second input shaft 12 and the first input shaft 11, respectively. Moreover, the ECU 20 connects the first input shaft 11 and the second input shaft through the third clutch 40 to make them rotatable together. Note that in the drawings, each arrow directed from left to right indicates the connecting of a clutch, while each arrow directed from right to left indicates the disconnecting of a clutch. The other arrows each indicate the rotating of an input shaft and a gear.

Figure 4:
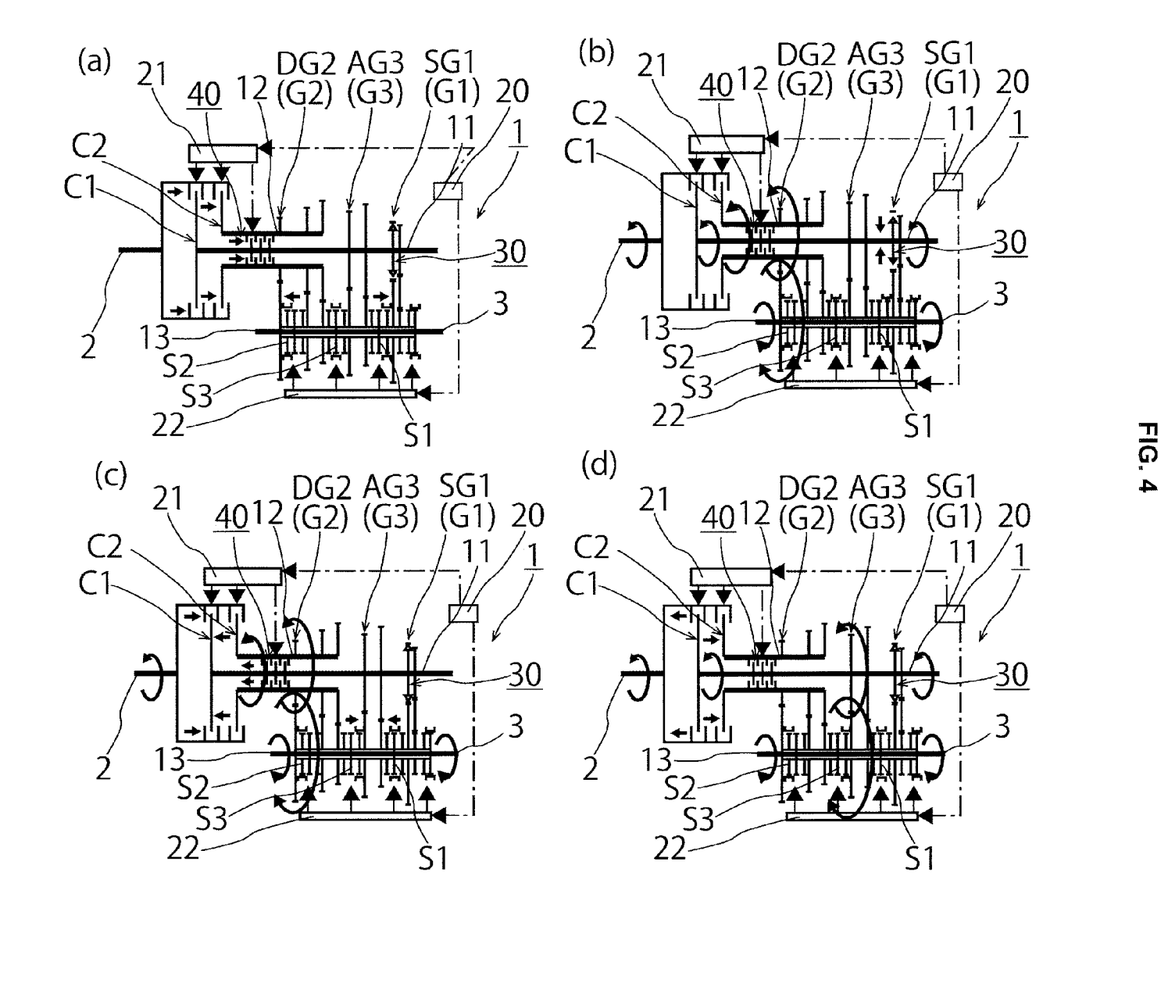
FIG. 4 shows a start operation of the dual clutch transmission of the first embodiment according to the present invention. Part (a) is a diagram showing a state before start of a vehicle, Part (b) is a diagram showing a state where both clutches are connected, a one-way clutch lets the support gear freewheel, and both input shafts are rotated together, Part (c) is a diagram showing a state where a second clutch is fully connected and a third clutch is fully disconnected, and Part (d) is a diagram showing a state during acceleration.

Then, as shown in Part (b) of FIG. 4, when the vehicle starts, the ECU 20 connects the first clutch C1 and the second clutch C2 to the first input shaft 11 and the second input shaft 12, respectively. At the start, the rotational speed of the first input shaft 11 is lower than the gear rotational speed of the support gear SG1, and the support gear SG1 therefore freewheels through the one-way clutch 30 and transmits no torque.

Then, as shown in Part (c) of FIG. 4, once the second clutch C2 is fully connected and becomes capable of sufficiently transmitting the torque currently being transmitted, the ECU 20 disconnects the first clutch C1 on the support gear SG1 side and disconnects the third clutch 40 as well. Moreover, the ECU 20 releases the synchronous engagement of the support gear SG1 and synchronously engages the acceleration gear AG3. In the case of a gear shift from the start gear DG2 to the acceleration gear AG3, the ECU 20 disconnects the second clutch C2 and connects the first clutch C1 as shown in Part (d) of FIG. 4.

Since this operation uses both clutches C1 and C2 during start, the wear of the second clutch C2 on the start gear DG2 side can be reduced. Accordingly, the replacement interval for both clutches C1 and C2 can be made longer.

Moreover, since the one-way clutch 30 lets the support gear SG1 freewheel, thereby transmitting no torque to the support gear SG1, it is possible to prevent double engagement that may otherwise occur due to the use of both clutches C1 and C2.

In addition, with the third clutch 40, the first input shaft 11 and the second input shaft 12 can be connected and rotated together. In this way, the entire torque transmitted can be transmitted to the start gear DG2. Further, the acceleration gear AG3 is synchronously engaged after the second clutch C2 is fully connected and becomes capable of sufficiently transmitting the torque currently being transmitted. In this way, in the case of a gear shift from the start gear DG2 to accelerate the speed, the acceleration can be done smoothly by simply switching the clutches C1 and C2.

Figure 5:
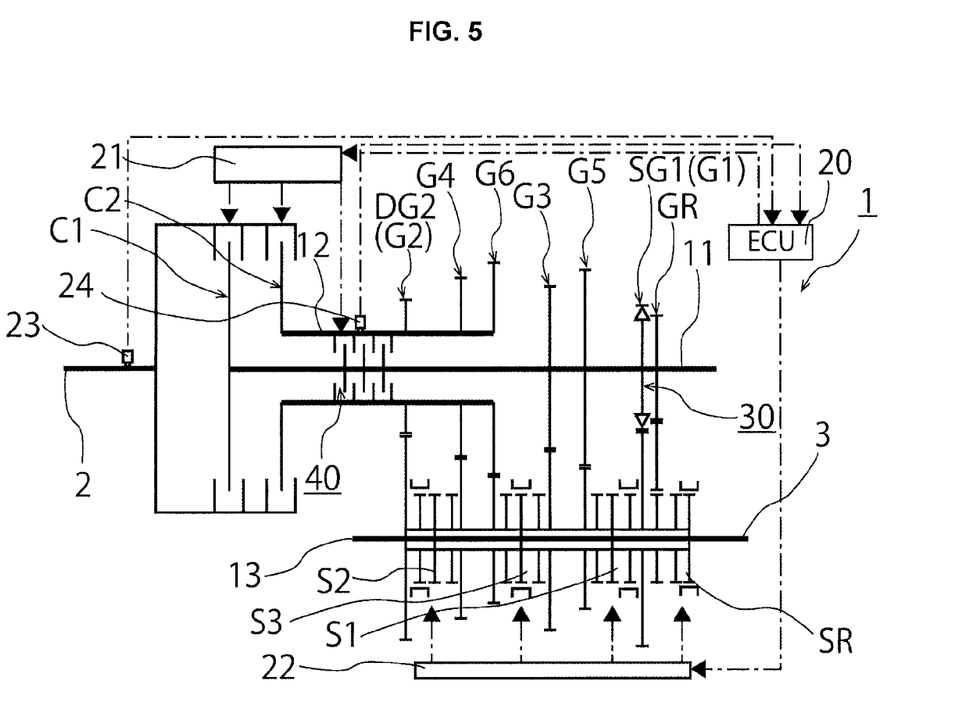
FIG. 5 is a schematic diagram showing a dual clutch transmission of a second embodiment according to the present invention.

Next, a dual clutch transmission of the second embodiment of the present invention will be described with reference to FIG. 5. As shown in FIG. 5, a second-clutch input-rotational-speed sensor 23 and a second-clutch output-rotational-speed sensor 24 are added to the same configuration as that in FIG. 1 described above.

The second-clutch input-rotational-speed sensor 23 is a sensor capable of detecting an input rotational speed Nin of the second clutch C2, and the second-clutch output-rotational-speed sensor 24 is a sensor capable of detecting an output rotational speed Nout of the second clutch C2. The input rotational speed Nin is the rotational speed of the crankshaft 2, and an existing crank angle sensor can be used. Moreover, the output rotational speed Nout is the rotational speed of the second input shaft 12 which is lower than the input rotational speed Nin due to the presence of the second clutch C2, and an existing speed sensor or the like can be used. Considering the gear ratio of the start gear DG2, this second-clutch output-rotational-speed sensor 24 can be provided to the output shaft 3 instead of being provided to the second input shaft 12.

Figure 6:
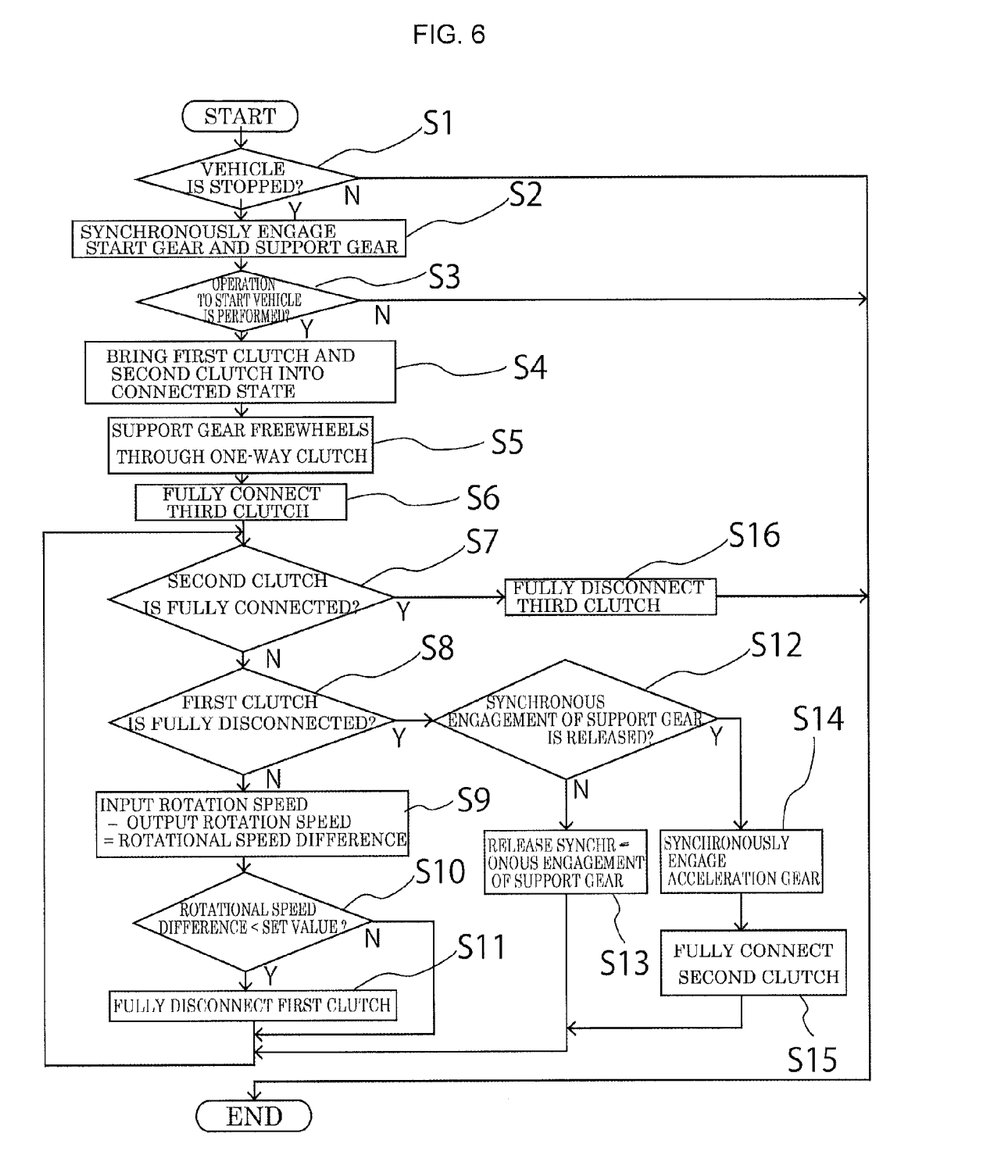
FIG. 6 is a flowchart showing a method of controlling the dual clutch transmission of the second embodiment according to the present invention.

Next, a method of controlling the DCT 1 will be described with reference to FIG. 6. First, the ECU 20 performs step S1 of determining whether or not the vehicle is stopped. If it is determined that the vehicle is stopped, the ECU 20 performs step S2 of synchronously engaging the start gear DG2 and the support gear SG1 to the second input shaft 12 or the first input shaft 11. In step S2, the ECU 20 synchronously engages the start gear DG2 and the support gear SG1 by operating the shift operation mechanism 22 to swing the coupling sleeve S2 and the coupling sleeve S1.

Then, the ECU 20 performs step S3 of determining whether or not an operation to start the vehicle is performed. If it is determined that an operation to start the vehicle is performed, the ECU 20 then performs step S4 of bringing the first clutch C1 and the second clutch C2 into a half clutch state on (partially connecting them to) the first input shaft 11 and the second input shaft 12, respectively. By step S4, the power from the crankshaft 2 can be transmitted to both clutches C1 and C2 and to the output shaft 3 at the moment of the start of the vehicle.

Then, since the rotational speed of the first input shaft 11 is lower than the gear rotational speed of the support gear SG1, the ECU 20 performs step S5 of letting the support gear SG1 freewheel by causing the one-way clutch 30 to operate in the state of Part (b) of FIG. 2. Then, as shown in FIG. 5, the ECU 20 performs step S6 of fully connecting the third clutch. As a result, the first input shaft 11 and the second input shaft 12 are connected and rotated together.

Then, the ECU 20 performs step S7 of determining whether or not the second clutch C2 is fully connected to the second input shaft 12. Since the second clutch C2 has been set to a half clutch state in step S4, the ECU 20 performs the next step S8 of determining whether or not the first clutch C1 is fully disconnected from the first input shaft 11. Since the first clutch C1 has likewise been set to a half clutch state in step S4, the ECU 20 proceeds to the next step.

Then, the ECU 20 performs step S9 of calculating a rotational speed difference ΔN between an input rotational speed Nin and an output rotational speed Nout of the second clutch C2. Then, the ECU 20 performs step S10 of determining whether or not the rotational speed difference ΔN is smaller than a set value Nlim which is a predetermined threshold. The second clutch 12 can be fully connected to the second input shaft when the value of this rotational speed difference ΔN reaches 0. Thus, the set value Nlim is set preferably to such a value that "set value Nlim=rotational speed difference ΔN>0." In the case where the rotational speed difference ΔN is equal to or greater than the set value Nlim in step S10, the ECU 20 returns to step S7 and performs steps S7 to S10 again.

Then, if it is determined that the rotational speed difference ΔN is smaller than the set value Nlim, the ECU 20 performs step S11 of fully disconnecting the first clutch C1 from the first input shaft 11. Once completing step S11, the ECU 20 then returns to step S7. At this point, the first clutch C1 is fully disconnected, the second clutch C2 is in a half clutch state, the start gear DG2 is synchronously engaged, and the support gear SG1 is synchronously engaged.

Thus, it is "N" in step S7, and the ECU 20 proceeds to step S8. If it is determined in step S8 that the first clutch C1 is fully disconnected, the ECU 20 then performs step S12 of determining whether or not the synchronous engagement of the support gear SG1 is released. Since the synchronous engagement of the support gear SG1 is not released, the ECU 20 performs next step S13 of releasing the synchronous engagement of the support gear SG1. Once completing step S13, the ECU 20 returns to step S7. At this point, the first clutch C1 is fully disconnected, the second clutch C2 is in a half clutch state, the start gear DG2 is synchronously engaged, and the support gear SG1 is released from its synchronous engagement.

Then, through steps S7, S8, and S12, determining that the synchronous engagement of the support gear SG1 is released, the ECU 20 then performs step S14 of bringing the acceleration gear AG3 into a synchronously engaged state. Once completing step S14, the ECU 20 performs step S15 of fully connecting the second clutch C2 to the second input shaft 12. Once completing step S15, the ECU 20 returns to step S7. At this point, the first clutch C1 is fully disconnected, the second clutch C2 is fully connected, the start gear DG2 is synchronously engaged, the support gear SG1 is released from its synchronous engagement, and the acceleration gear AG3 is synchronously engaged.

If it is determined in step S7 that the second clutch C2 is fully connected, the ECU 20 then performs step S16 of fully disconnecting the third clutch and ends this control method.

According to this method, the same operation and effect as those described above can be achieved. Moreover, since the control is performed by determining the timing to fully connect the second clutch C2 based on the rotational speed difference ΔN of the second clutch C2, smooth start control can be performed. The above control method can be performed only by adding the second-clutch input-rotational-speed sensor 23 and the second-clutch output-rotational-speed sensor 24.

Figure 7:
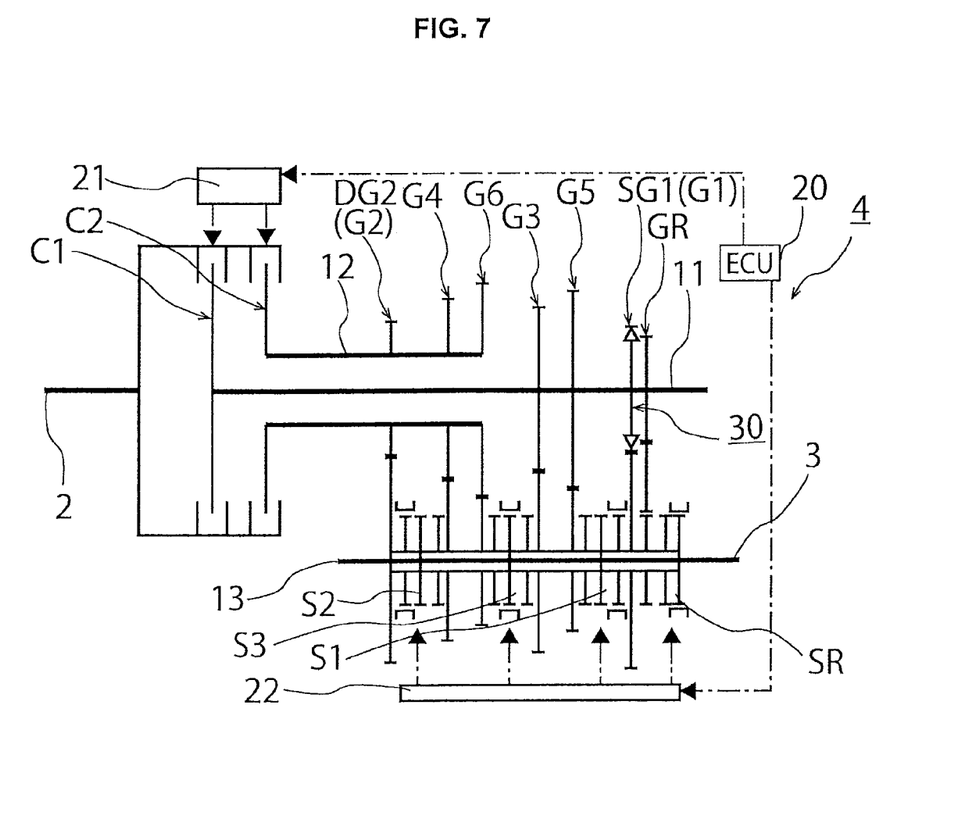
FIG. 7 is a schematic diagram showing a dual clutch transmission of a third embodiment according to the present invention.

Next, a dual clutch transmission of the third embodiment according to the present invention will be described with reference to FIG. 7. A dual clutch transmission 1 of the second embodiment has a configuration excluding the third clutch 40 in FIG. 1 mentioned earlier. This configuration can prevent double engagement as in the cases above by releasing the synchronous engagement of the support gear SG1, that is, by bringing the support gear SG1 into a neutral state during start.

A vehicle equipped with the above-described DCT 1 can make the wear of both clutches C1 and C2 even and therefore make the replacement interval for both clutches C1 and C2 longer than conventional cases. Moreover, the above-described operation and effect can be achieved without changing the feel during start, and therefore a vehicle with good driving comfort can be provided.

The methods of controlling a dual clutch transmission of the present invention can reduce the load on the clutch on the start gear side and thus reduce the wear thereof and therefore make the clutch replacement interval longer, without changing the feel during start. Moreover, the methods of controlling a dual clutch transmission of the present invention can prevent double engagement that may otherwise occur due to the use of botch clutches, and also transmit the torque transmitted to both clutches entirely to the start gear. In addition, the methods of controlling a dual clutch transmission of the present invention can make a gear shift operation after start smooth. Accordingly, the methods of controlling a dual clutch transmission of the present invention can be utilized in large-sized vehicles such as trucks equipped with a dual clutch transmission to achieve low fuel consumption via smooth gear shift operations.

The invention claimed is:

1. A dual clutch transmission, which includes at least a first input shaft configured to be connected to a first clutch, a second input shaft configured to be connected to a second clutch, a set of odd-numbered gears and a set of even-numbered gears arranged, respectively, across the first input shaft and an output shaft and across the second input shaft and the output shaft, and when starting transmission of power from a power source to the output shaft, the transmission of the power is started by synchronously engaging a start gear which is one of the gears for start to the second input shaft, and connecting the second clutch to the second input shaft, the dual clutch transmission comprising:

a support gear disposed on the first input shaft and having a gear ratio different from that of the start gear;

a rotation disconnecting mechanism between the support gear and the first input shaft, the rotation disconnecting mechanism being configured to let the support gear freewheel when the transmission of the power from the power source to the output shaft is started by synchronously engaging the start gear and the support gear to the second input shaft and the first input shaft, respectively, and simultaneously bringing each of the first clutch and the second clutch into a connected state, wherein any one of the first input shaft and the second input shaft is formed as a hollow shaft, and the other as an insertion shaft is inserted inside the hollow shaft coaxially; and an input connecting mechanism configured to rotate the hollow shaft and the insertion shaft together when the transmission of the power from the power source to the output shaft is started.

2. The dual clutch transmission according to claim 1, wherein the rotation disconnecting mechanism is formed of a one-way clutch configured to let the support gear freewheel when a rotational speed of the first input shaft is a rotational speed lower than a gear rotational speed of the support gear.

3. A method of controlling the dual clutch transmission according to claim 1, comprising:

causing the input connecting mechanism to rotate the first input shaft and the second input shaft together and causing the rotation disconnecting mechanism to let the support gear freewheel, when the transmission of the power from the power source to the output shaft is started by synchronously engaging the start gear and the support gear to the second input shaft and the first input shaft, respectively; and simultaneously bringing each of the first clutch and the second clutch into a connected state.

4. A vehicle equipped with the dual clutch transmission according to claim 1.

5. A vehicle equipped with the dual clutch transmission according to claim 2.

\* \* \* \* \*